INVENTOR
James W. Fogle
by McDougall, Hersh, Scott
and Ladd
Att'ys

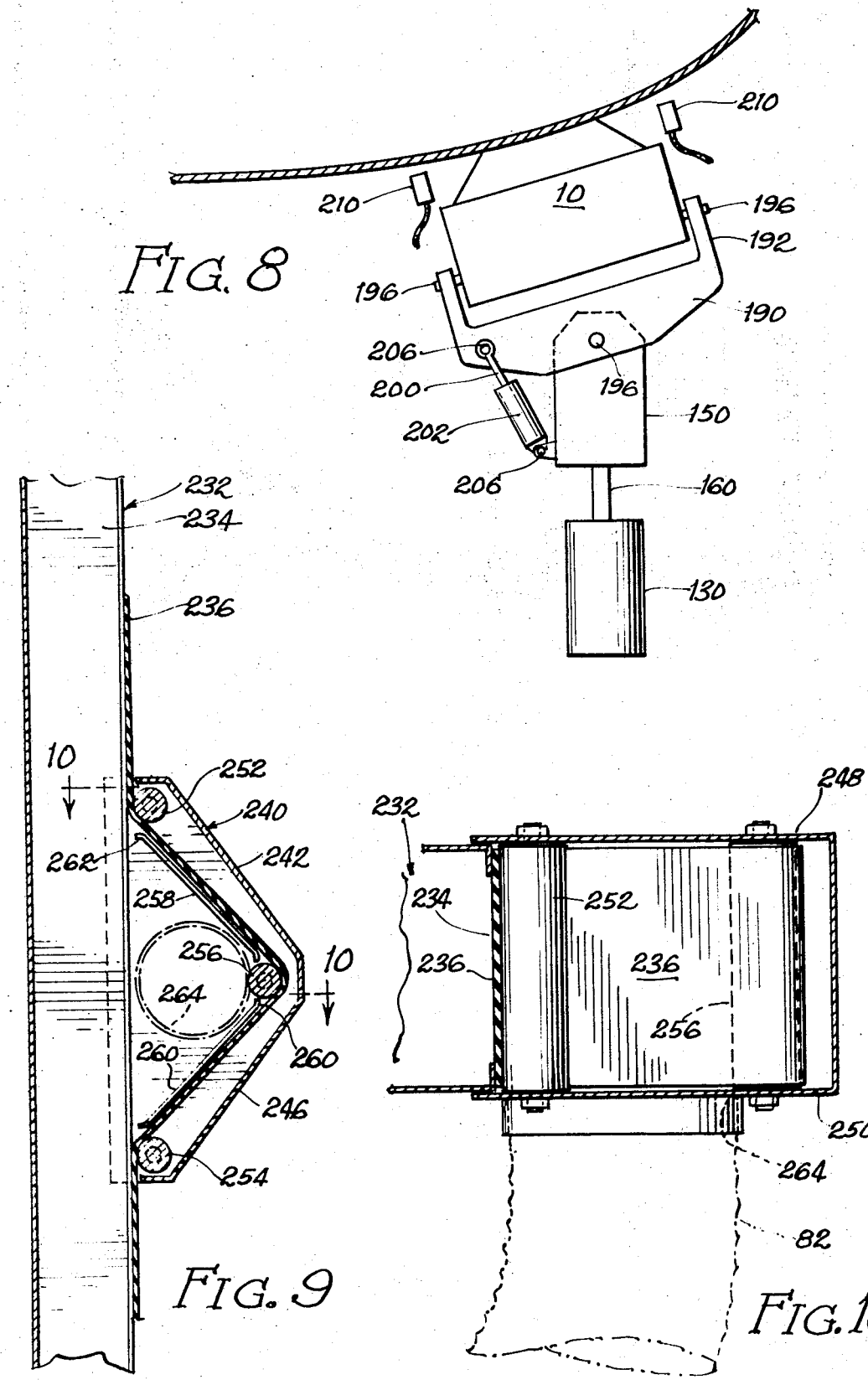

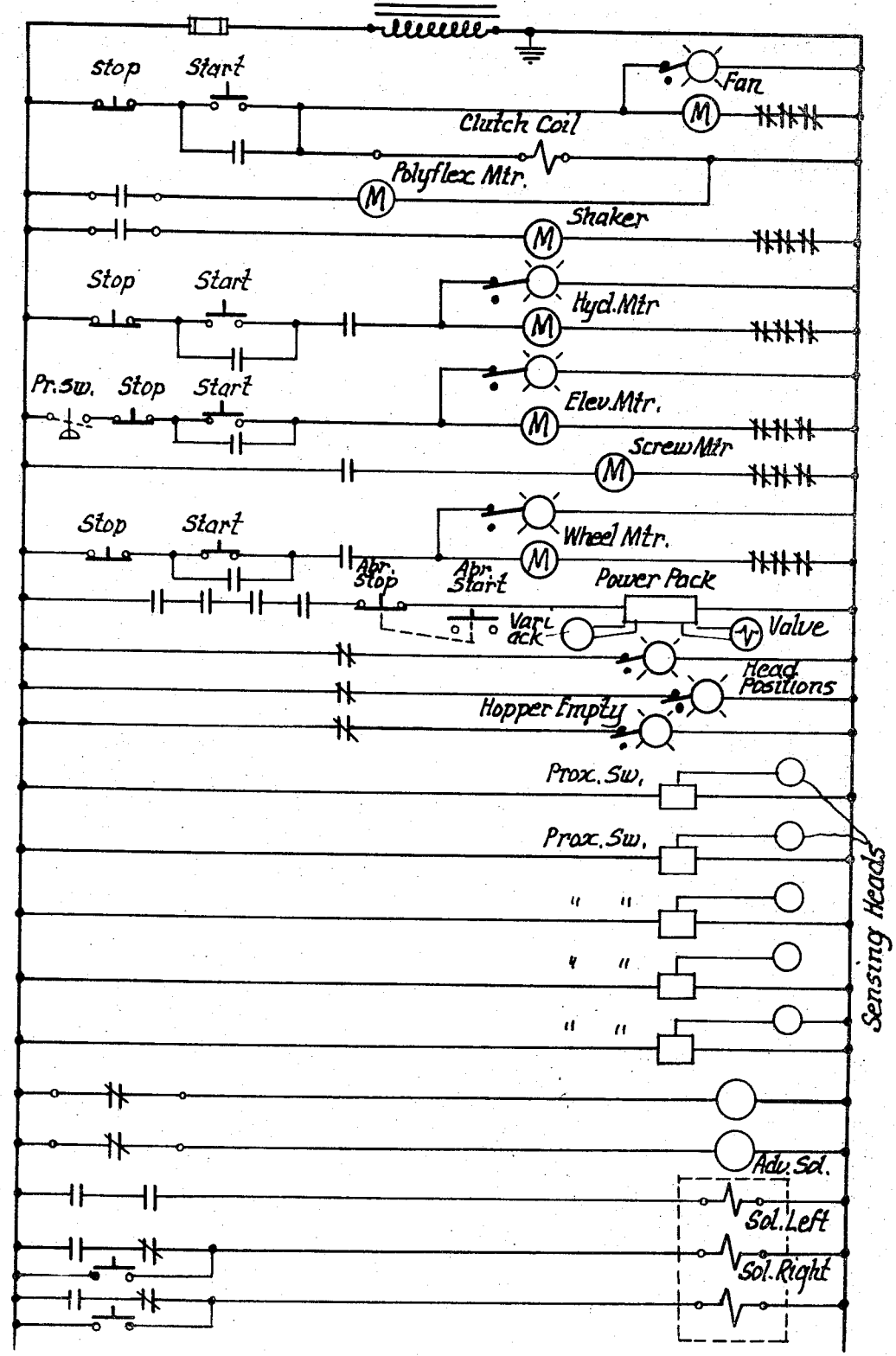

United States Patent Office 3,566,543
Patented Mar. 2, 1971

3,566,543
MACHINE FOR TREATMENT OF LARGE
VERTICAL SURFACES
James W. Fogle, Walkerton, Ind., assignor to The
Wheelabrator Corporation, Mishawaka, Ind.
Filed Feb. 6, 1968, Ser. No. 703,397
Int. Cl. B24c 3/00
U.S. Cl. 51—9                                    18 Claims

ABSTRACT OF THE DISCLOSURE

A machine and method for treatment of vertically disposed surfaces of large dimension with dry particulate material comprising means for throwing the dry particulate material at high velocity in the direction toward said surface, a housing enclosing said throwing means having an opening through which the particulate material is thrown against said surface, means for establishing a sealing relationship about said opening between the housing and said surface to confine the particulate material, dirt and dusts within the sealed space, means for collecting the spent particulate material at the bottom portion of the housing and for introducing air into the housing for air washing the spent particulate material to remove dirt and dusts, recycling the washed particulate material for feed to the throwing means, a dust collector for receiving the dirt and dust from within the housing for separation thereof and means for maintaining subatmospheric conditions within the housing to guide the air flow through the housing and about said sealing means to minimize the exhaust of dirt and dust into the atmosphere and in which the support means for said housing includes means for movement of the housing in the vertical direction, means for movement of the housing in the horizontal direction and means for movement of the housing in the direction toward and away from the surface and means for mounting the housing for rocking movement about its pitch and yaw axes to adjust the housing with change in contour of the surface, and sensing means about the opening automatically to adjust the housing for change in contour about the pitch axis and/or the yaw axis and for movement of the housing in the direction toward and away from the surface and for shutting off the feed of particulate material in the absence of a sealing relationship between the housing and surface.

---

This invention relates to the treatment of surfaces of vertically disposed walls of large dimension, such as the outer side walls of a ship's hull, large conservation tanks for water, gas and the like fluid materials, or other paneled structures, and it relates more particularly to means for cleaning such vertically disposed paneled structures or walls with dry particulate abrasive materials blasted onto the surface.

To the present such surfaces or walls are air blasted with crushed slag as the abrasive. Such abrasive particles break down so rapidly that no attempts are made for recovery and the abrasive is wasted after the single use. The described cleaning process is subject to a number of drawbacks including high cost by reason of the high cost of the compressed air that is required; the slow rate of cleaning; the need for three men for operation of a single cleaning head; the high cost for handling large amounts of abrasive; the labor and equipment required to remove the abrasive; and the need to dispose of the large amount of spent abrasive that is continuously being generated.

Aside from the above disadvantages, the process presently employed is characterized as a dirty process which raises excessive amounts of dust and additional means are therefore required to protect personnel on the ship.

It is an object of this invention to provide means for surface teratment of vertical panels and walls of large dimension by blasting with dry particulate material in which use can be made of reusable particulate material thereby materially to reduce the cost of the abrasive and the amount of labor and equipment for handling and disposal of the lesser amount of unusable spent abrasive generated in the process, which is a substantially dust-free operation, which operates substantially automatically and continuously materially to reduce the cost of labor and markedly to increase the rate of surface treatment, which provides a surface clean enough to permit the cleaning process to be followed by a surface finishing operation without intermediate processing, which embodies automatic adjustments for uniform treatment of the surface, which is simple in construction and easy in operation and which is sufficiently flexible for uniform coverage of surfaces of variable or changing contour.

These and other objects and advantages of this invention will hereinafter appear and, for purposes of illustration, but not of limitation, an embodiment of the invention is shown in the accompanying drawings in which:

FIG. 8 is a view schematically showing the arrangement of elements for angular adjustment of the blasting head;

FIG. 9 is an elevational view partially in section of the duct communicating the blast chamber with the dust collector;

FIG. 10 is a sectional view taken along line 10—10 of FIG. 9; and

FIG. 11 is an electrical diagram for the machine.

Figure 1:
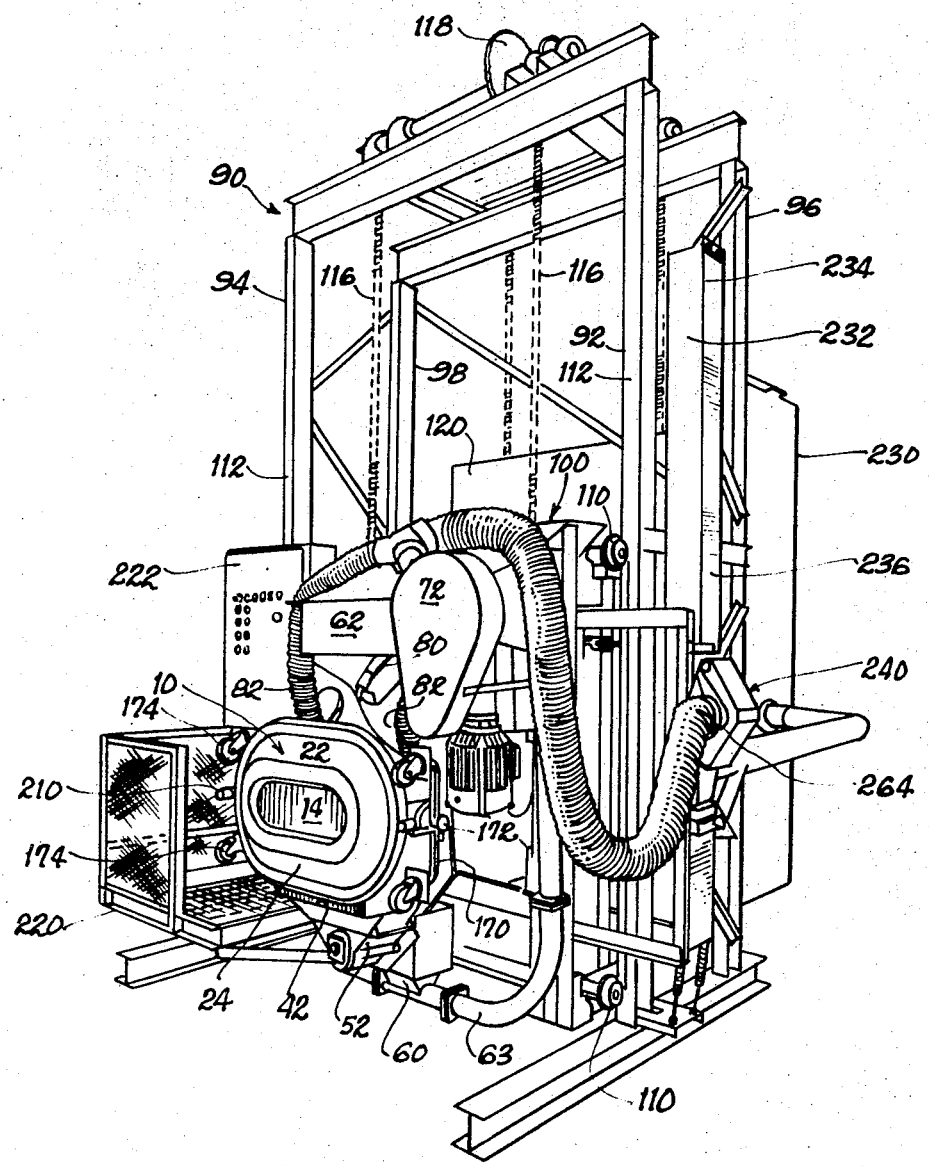
FIG. 1 is a perspective view in elevation of a machine embodying the features of this invention.
Figure 2:
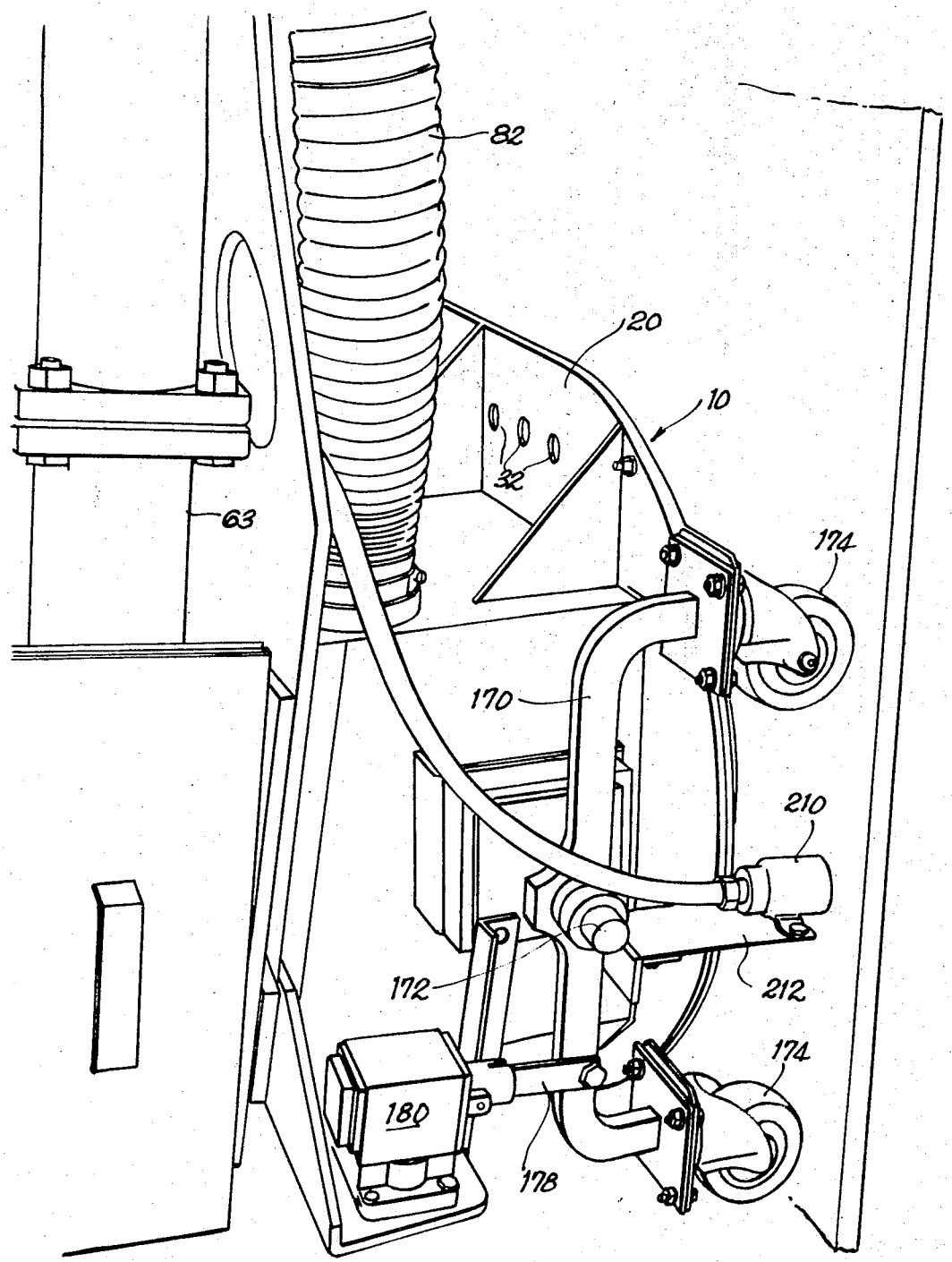
FIG. 2 is a perspective view in side elevation of the blasting head alongside a wall to be treated.
Figure 3:
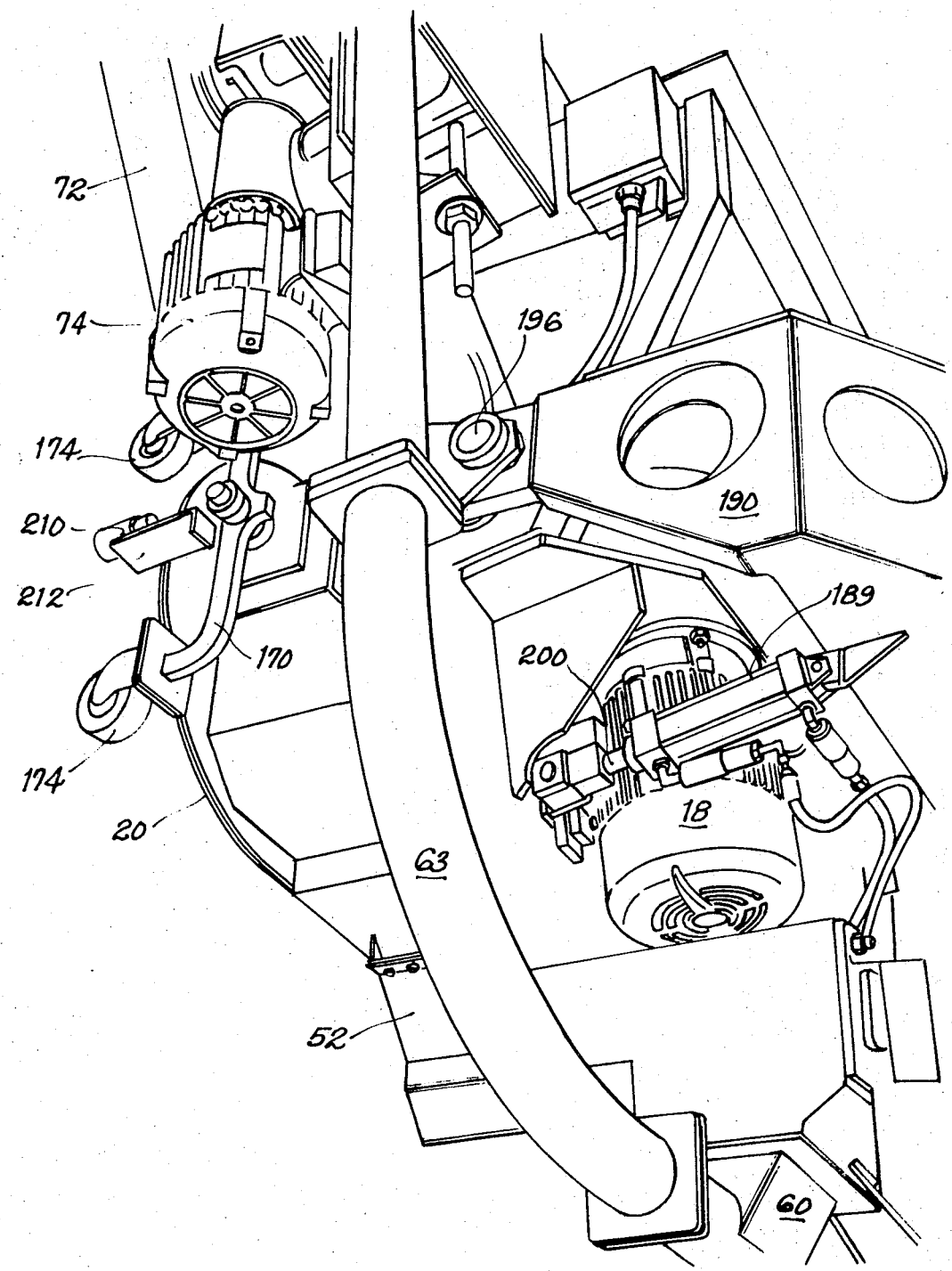
FIG. 3 is an enlarged perspective view in rear elevation of the blasting head and supports.
Figure 4:
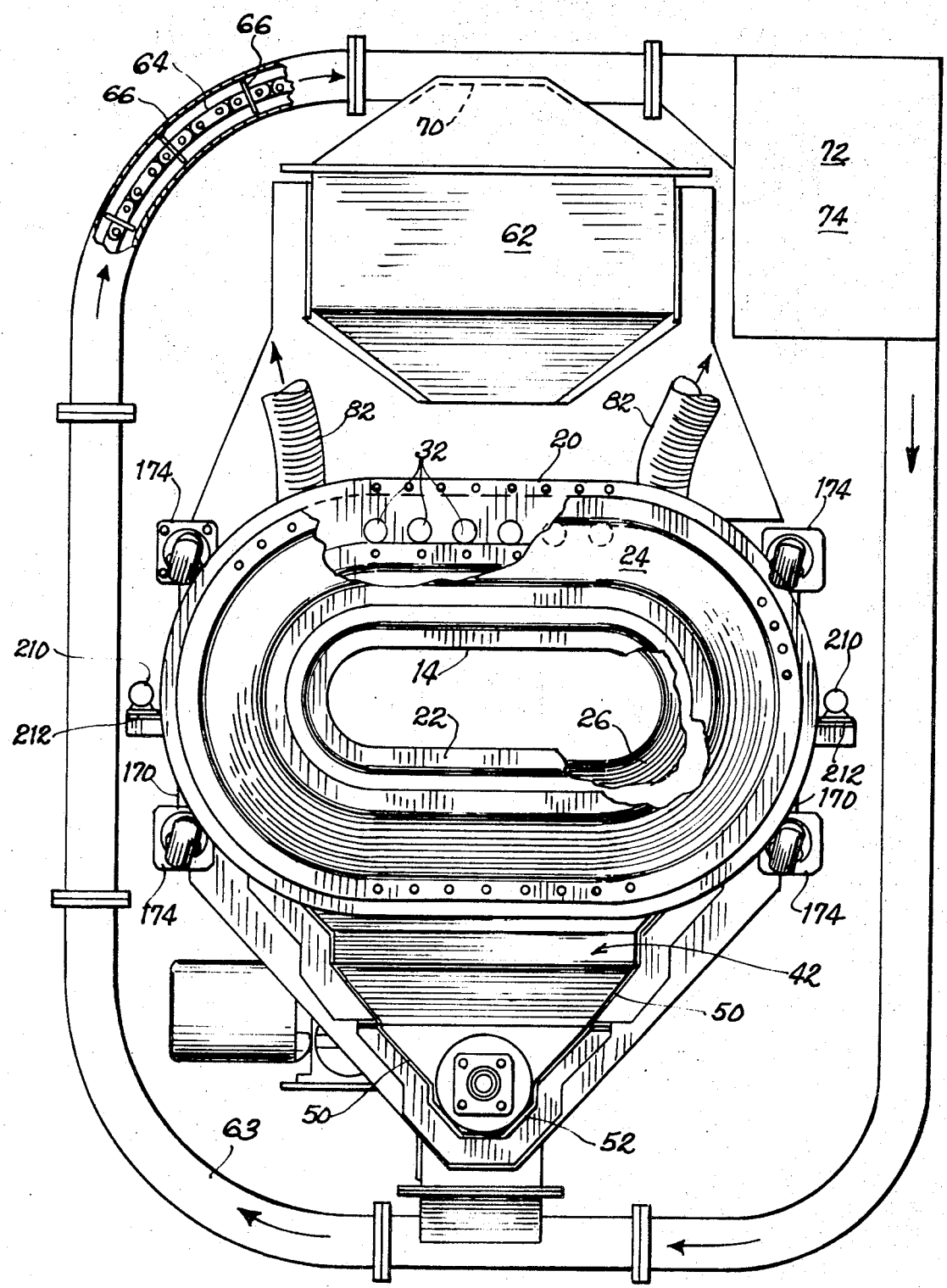
FIG. 4 is a front elevational view of the blasting head and associated elements.
Figure 5:
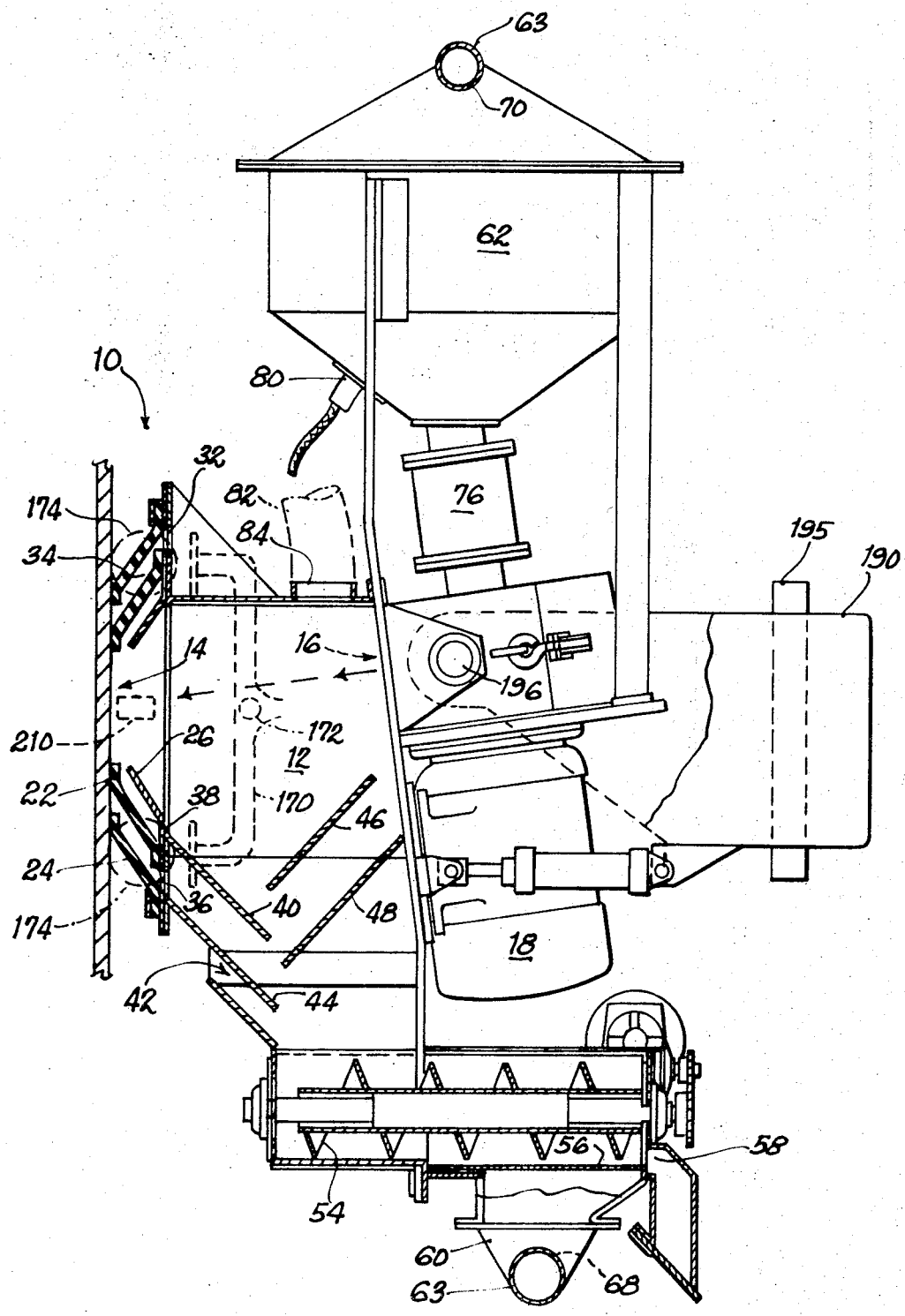
FIG. 5 is a side elevational view partially in section of the blasting chamber and abrasive handling parts.

Invention will hereinafter be described with reference to a machine for cleaning the outer surfaces of a ship's hull with dry particulate material blasted onto the surface of the hull by a centrifugal wheel in an assembly which can be moved about the hull in a manner to accommodate the various curvatures of the ship's hull for substantially uniform complete coverage thereof.

It will be apparent from the description that the machine and method of this invention can be employed equally well for the cleaning or otherwise treating of the vertically disposed walls of outside storage or conservation tanks of large capacity or other vertically disposed walls of metal or the like paneled structures.

The machine of this invention makes use of a single blasting head 10 which includes a blast chamber 12 having an opening 14 at its forward end which may be of various configurations but which is preferably of oval or rectangular shape with the major length of the opening perpendicular to the axis of the bladed centrifugal throwing wheel 16 mounted for rotational movement within the base of the chamber 12 for turning movement about a vertical axis. Centrifugal blasting wheels of the type described are manufactured and sold by The Wheelabrator Corporation of Mishawaka, Ind., under the trade name "Wheelabrator" and are more specifically described in U.S. Pats. Nos. 2,708,814 and 2,819,562. Suffice it to say that such throwing wheels comprise a plurality of radially extending blades arranged in circumferentially spaced apart relation between confining disc plates with means for feeding particulate treating material, such as steel shot, steel grit or the like onto the inner ends of the blades whereby such particulate material is thrown centrifugally at high velocity from the outer ends of the blades as the wheel is rotated at high speed about its axis by the driving motor 18. The particulate material is thrown forwardly from the ends of the blades through the open end of the blast housing into engagement with the surface facing the blast housing.

Means are provided to effect a sealing relationship between the blast housing and the surface to be treated so as to permit recovery of the abrasive particles thrown against the surface and for removal of dust generated within the sealed space during the cleaning or surface treating operation.

For this purpose, a large flanged plate 20 is secured to the open edge of the blast chamber and inner and outer sealing members 22 and 24, formed of resilient or rubber-like material such as polyurethane, and of frustoconical shape, are secured to extend continuously about the blast opening 14 with the rearward ends of the sealing members secured to the flanged plate 20 to provide a spaced relationship therebetween.

The resilient sealing members 22 and 24 are protected from the abrasive thrown outwardly from the wheel by a baffle plate 26 which is secured to the flanged plate 20 inwardly of the inner sealing member 22 and arranged to project angularly outwardly between the sealing member and the interior of the blast chamber for a distance to correspond with the innermost reach of the sealing members.

The sealing members 22 and 24 are adapted to engage the surface to be treated immediately adjacent the blast area and means are provided for sealing engagement in a manner to deflect the forward edge portions of the sealing members when the blasting head is in proper position of use thereby to effect a sealing relationship between the blast chamber and the surface. Air inlet spaces 30 encircle the upper end portion of the blast chamber and communicate with the space between the inner and outer sealing members 22 and 24 through openings 32 whereby air under pressure flows into the space 34 between the sealing members to cool the sealing members and to assist in the removal of abrasive from between the seals for delivery of spent abrasive and dirt through the outlet slot 36 at the bottom.

After engaging the surface to be cleaned, the spent abrasive falls gravitationally downwardly through the openings 36 between the sealing members or through the slot 38 in the flange plate 20 at the base of the inner sealing member 22 or over the deflector plate 26 and the shed plates 40 at the bottom of the blast chamber. The blasting head is provided with an air inlet 42 immediately below the shed plates 40, 44, 46 and 48 for the introduction of air which passes upwardly about the inner ends of the shed plates and through the descending curtain of spent abrasive and dust to air wash the abrasive and remove dust and fines from the spent abrasive. For this purpose, the shed plates 40, 44, 46 and 48 comprise vertically spaced apart downwardly angled plates having their inner edges in overlapping relationship to provide a cascade of the particulate abrasive downwardly over the surfaces of the plates and about their ends and through the washing air stream at the bottom of the blast chamber A large amount of heat is generated by the impact of the abrasive on the walls. The washing of the abrasive with air operates to cool the abrasive and prevent heat build-up in the abrasive in the various components of the whole assembly. By the described arrangement of air flow, it becomes possible to operate the blasting head continuously for hours with little, if any, heat build-up in the abrasive.

The side walls 50 of the blast housing below the blasting head converge angularly inwardly in the direction towards each other to define a collecting chute through which the air washed abrasive and air separated particles fall gravitationally into a trough 52 at the bottom having a screw 54 rotatably mounted therein for displacement of the collected particlulate material rearwardly for movement over a perforated plate or screen 56, which forms a part of the bottom wall of the conveyor and through which the reusable abrasive particles pass while the larger particles of paint, rust, scale and the like are displaced over the surface of the screen to a discharge chute 58 communicating with the far end of the screen for discharge as waste.

The abrasive particles which pass through the perforated plate or screen 56 are returned a feed for the centrifugal throwing wheel. For this purpose, a trough 60 is provided beneath the perforated plate for collection of the abrasive particles passing through the screen. A conveyor returns the abrasive particles collected in the trough to the feed hopper 62 above the blast chamber. Various conveyors or elevator means may be employed for lifting the abrasive particles to the feed hopper. In the preferred practice of this invention, it is desirable to make use of a means in which a substantial sealed relationship can be maintained in the conveyor means to minimize the flow of air therethrough in response to the suction generated in the blast chamber by the dust collector, which will hereinafter be described.

One such elevator means illustrated in the drawings comprises a tube elevator which makes use of a continuous length of rigid tubing 63 which encircles the blast assembly. A link chain 64 extends continuously through the interior of the rigid tubing and spaced links are provided with disc members 66 which function in the manner of a piston head to sweep the abrasive particles in advance thereof through the tube. Such disc members are preferably formed of relatively rigid material, such as polyurethane discs, which are capable of sealing engagement with the surrounding wall of the tubing with minimum frictional resistance to permit linear displacement with the link chain without excessive work.

The portion of the tubing underlying the trough is cut away to provide an opening 68 through which the abrasive particles will fall from the trough into the tubular conveyor and into the path of the disc members. Similarly, the portion of the tubing overlying the hopper 62 is also provided with an opening 70 to enable the raised abrasive particles to fall from the tubing into the hopper. Means for continuous displacement of the link chain is provided beyond the delivery opening in the form of an electrical motor 72 connected to a suitable speed reducer 74 having a sprocket on the end thereof fastened operatively to engage alternate links of the chain.

The feed hopper 62 is mounted above the wheel 16 for feeding abrasive particles to the inner ends of the blades of the rotating wheel which throws the abrasive particles centrifugally from the ends of the blades in the direction toward the opening 14 in the blast head onto the facing surface to be processed. A valve 76, such as an electromagnetic valve, is inter-posed in the feed line 78 between the hopper and the wheel to control the flow rate of the shot, grit or other abrasive particles to the wheel. The hopper is provided with a sensing means 80, such as a switch means extending through the side wall into a lower portion of the hopper to shut the valve when the level of abrasive falls below the sensing means in the hopper.

In operation, with the sealing strips 22 and 24 in sealing engagement with the surface to effect a substantially sealed relationship between the blasting head and said surface, subatmospheric conditions can be maintained within the head to effect the described directional flow of air about the sealing strips and for air washing the spent abrasive as well as to carry off the dusts from within the chamber to the dust separator. In the preferred practice of the invention, such subatmospheric conditions are maintained through the dust collector which communicates with the interior of the blasting head whereby such subatmospheric conditions are maintained simultaneously with the effective removal of dust entrained with the air traveling through the blast chamber thereby to prevent the issuance of such dust and dirt into the atmosphere. Use can be made of a dust collector of the conventional type with ducts 82 connecting the outlets 84 at the top of the blast chamber with the collector.

Special means are interposed between the ducts and the dust collector to permit the various movements of the blast chamber hereinafter to be described to enable the blast head to conform with the contour of the surface being cleaned and for movement of the blast chamber over the surface for coverage of the surface during the cleaning operation. Such special connection means for a movable head is believed to constitute a new and novel construction which may be described and claimed in a separate application but which will also hereinafter be described to complete the description of the machine.

Having described the basic elements of the blast head and the operation thereof, description will now be made with respect to the mounting of the head on suitable supports for movement of the head vertically to cover a vertical section of the surface and laterally for coverage of a width of surface as well as movement in the direction toward and away from the surface to achieve the desired sealing engagement with the surface during the operation. The blast head will also be gimbal mounted for rocking movement about a vertical yaw axis as well as horizontal about a pitch axis to conform the head to change in surface contour in the vertical direction as well as in the horizontal direction and with means operative automatically or manually to effect such movements in response to changes in contour or curvature and to maintain the pressure contact between the head and surface sufficient to deflect the ends of the sealing members 22 and 24 to maintain the desired sealing relationship.

The described assembly, including the blast chamber, spent abrasive collector, hopper and elevator are mounted for movement together in the vertical, lateral, forward and rearward directions on suitable frame and guide members including a tower 90 formed of four spaced masts or columns 92, 94, 96 and 98. The tower is preferably adapted to be shiftable alongside the wall for positioning the blast chamber operatively to engage additional increments of the wall surface for treatment. This semi-stationary tower would normally be stationary during the time the blast head is in operation, but it would be capable of being moved intermittently to a new position alongside the work surface by means of a barge, tracked vehicle or otherwise. A main frame 100 in the form of a rectangularly shaped section formed of a pair of vertically disposed laterally spaced apart angle members 102 and 104 and a pair of horizontally disposed vertically spaced apart angle members 106 and 108, joined one to the other at their outer ends, is mounted for guided up and down movement between the fixed masts 92, 94, 96 and 98. For this purpose, the side members 102 and 104 support vertically spaced apart guide rollers 110 extending laterally into operative engagement in side tracks 112 provided on the inner surfaces of the masts to guide the main frame during movement vertically relative to the main frame. The rollers 110 are mounted for free rotational movement on suitable spindles supported by arms 114 rigid with the angle members 102 and 104 on the main frame.

Lift means are provided for raising and lowering the main frame relative the fixed masts. One such lift means, illustrated in the drawings, comprises a flexible chain 116 operative over a sprocket wheel 118 mounted for free rotational movement on a spindle supported at its ends between the masts at a level above the upper limit of travel of the main frame. The chain is connected at one end to the center of the upper crosswise extending angle member 106 of the main frame while the other free end, which depends from the sprocket wheel 118, supports a counterbalance 120 for the main frame and the elements supported thereby. Motor means, not shown, are provided for movement of the chain to raise and lower the main frame. It will be apparent that other means for elevating and lowering the main frame relative to the supporting masts may be employed and that the vertical travel of the main frame relative to the masts will depend somewhat upon the length of the masts. In a practical modification, the masts are dimensioned to enable vertical movement of the main frame for a distance within the range of 30 to 70 feet. Means other than the tower and fixed masts can also be used to support and provide vertical movement of the main frame and assembly. For example, the main frame and assembly could be supported and moved vertically by means of overhead cables, cranes, telescoping supports or other means.

An inner frame 130 is adapted to be supported on the main frame 100 for sidewise movement relative thereto. Such inner frame comprises a rectangular section formed of interconnected, laterally spaced apart, vertically disposed channel members 132 and 134 and horizontally spaced apart upper and lower crosswise extending channel members 136 and 138.

Laterally spaced apart rollers 140 mounted for rotational movement on the upper and lower, horizontally disposed main frame members are adapted to be received in guide rails 142 on the underside of the channels 136 and 138 of the inner frame members to permit the inner frame member to move laterally relative the main frame member 100 to the extent permitted by the portions of the main frame between the fixed masts. Thus the extent of lateral movement of the inner frame 130 will be somewhat less than the amount of vertical movement of the main frame. In the illustrated modification, a lateral travel of about 4 to 10 feet can be easily designed into the unit. Thus the inner frame 130 is capable of vertical and sidewise movement relative the fixed masts.

Lateral movement of the inner frame 130 relative the main frame 100 is adapted to be effected by means of a pressure fluid operated piston and cylinder assembly in which the end of the piston 144 is anchored to either the main frame 100 or the inner frame 130 while the base of the cylinder 146 is anchored to the other of the frame members with the piston and cylinder extending horizontally to effect lateral displacement of the inner frame relative the main frame. It will be apparent that other conventional means may be employed to provide the desired relative displacement between the frame members such as a horizontally disposed rack secured to the inner frame in operative engagement with a motor operated pinion gear supported by the other frame with the pinion in engagement with the rack to effect relative lateral movement of the inner frame to the main frame in response to motor operation of the gear in one direction or the other.

Figure 6:
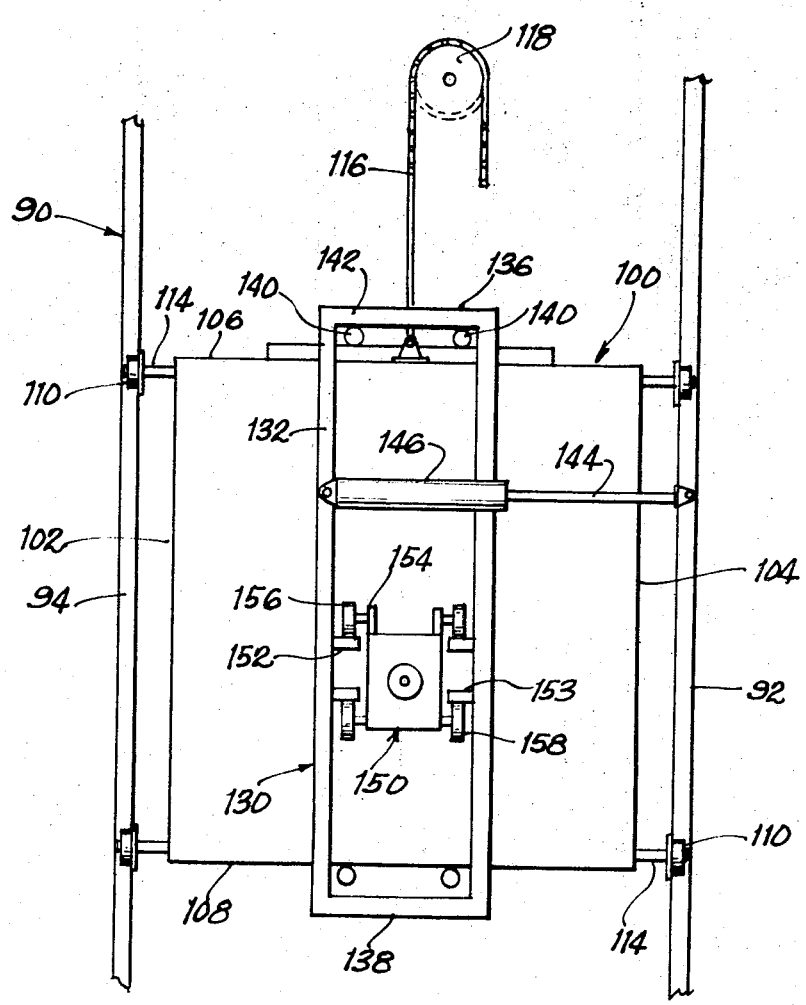
FIG. 6 is a schematic elevated view of the various frame members for support of the blasting chamber.

The inner frame 130 independently supports a head frame 150 in a manner to permit forward and backward movement relative to the inner frame and the main frame and masts in the direction toward and away from the surface to be cleaned. As illustrated in FIG. 6, the side channel members 132 and 134 of the inner frame 130 are laterally spaced by an amount to receive the head frame supporting the blast chamber therebetween. Secured to each of the inner edges of the laterally spaced apart vertical channel members 132 and 134 are a pair of longitudinally disposed, inwardly extending, vertically spaced apart platforms or rails 152.

The head frame 150 is provided with vertically spaced apart arms 154 which extend outwardly from the opposite sides thereof and rollers 156 are mounted for free rotational movement on the ends of each of said arms with the rollers on each side being spaced vertically by an amount slightly greater than the vertically spaced apart relation between the platforms 150 when the upper rollers are in position to ride on the surfaces of the upper platforms 152 while the lower rollers 158 reside adjacent the bottom side of the lower platforms 153 to establish a guided support for the head frame while permitting movement of the head frame horizontally in a direction perpendicular to the inner frame.

Figure 7:
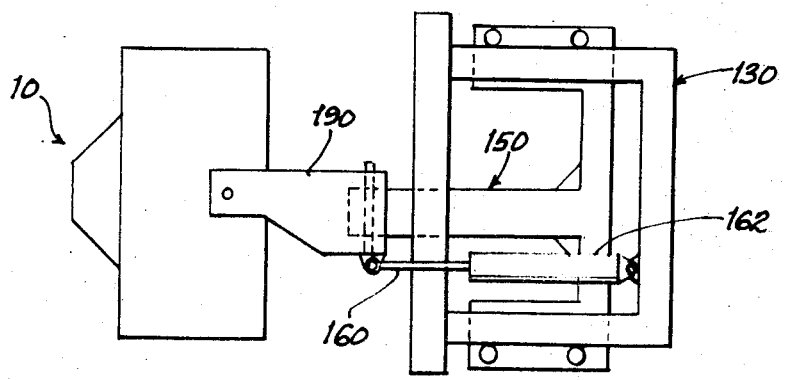
FIG. 7 is a view similar to that of FIG. 6 showing the arrangement of elements for movement of the blasting head in the forward and rearward direction relative the supporting frames.

Means are schematically illustrated in FIG. 7 of the drawings for actuation of the head frame for movement relative the inner frame. As illustrated in the drawings, one such means comprises another pressure fluid operated piston and cylinder assembly in which the end of the piston 160 is pivotally attached to a portion of the head frame 150 while the base of the cylinder 162 is pivotally attached to a rearward portion of the inner frame 130. Pivotal means for attachment are employed to enable the gimbal mounting of the blast chamber for rocking movement about its vertical and horizontal axes relative the supporting frames.

It will be understood that other conventional means may be employed for displacement of the head frame relative the inner frame. For example, a similar pinion gear and rack arrangement can be employed with the rack horizontally positioned and secured either to the head frame or inner frame while the motor driven pinion gear is secured to the other with the gear in operative engagement with the teeth of the rack.

Means are provided to tilt the blasting head about the pitch axis and about the yaw axis as well as automatically to adjust the head in the direction toward and away from the surface being cleaned for equalizing pressure on the seals in a manner to maintain the desired sealing relation between the sealing members and the surface.

In the illustrated modification, the means for adjustment of the head about its pitch axis allows for change in the contour of the ship's hull in the vertical direction. In the illustrated modification, such means comprises a yoke 170 on each side of the head pivoted at its center on pivot pins 172 rigid with the side wall of the blast chamber for free rocking movement relative the housing about the pitch axis. Casters 174, in the form of rubber rollers, are rotatably mounted on the vertically spaced apart ends of the yoke in position to extend forwardly of the face of the blast head into rolling engagement with vertically spaced apart portions of the surface 176 being treated, when the blast head is in proper position of use. An arm 178, pivoted at one end onto an offset portion of the yoke, extends rearwardly for operation of a four-way valve 180 mounted on the head frame.

Change in surface contour will react through the rollers to cause the yoke to rock about its pivot with corresponding displacement of the arm 178 in one direction or the other depending upon the change of angle of the yoke. Rocking movement of the yoke about its pivot in the clockwise direction will operate to make the valve for movement in one direction and rocking movement of the yoke in the counterclockwise direction will operate to make the valve for movement in the opposite direction.

A yoke 190, forming a part of the head frame, supports the blast head for rocking movement about the pitch axis. For this purpose, the yoke is formed with laterally spaced apart arms 192 and 194 which extend alongside the blast housing with pivot pins or trunnions 196 extending inwardly into engagement with bearings on the side walls of the blast housing pivotally to mount the blast housing for rocking movement. Thus the blast housing of the blasting head is capable of rocking movement about its horizontal axis relative the head frame. Rocking movement of the blasting head relative the head frame is effected by a pressure fluid operated piston and cylinder assembly with the cylinder 198 anchored at the far end to the yoke 190 while the piston 200 is pivotally secured at its free end to a portion of the head vertically offset from the pivotal axis. The piston and cylinder are controlled by the four-way valve 180 for operation in one direction or the other for angular adjustment of the head.

For pivotal support of the head for rocking movement about the yaw axis, the head and yoke 190 are supported as a unit on a vertically disposed shaft 195 which extends through a vertically aligned opening through the center of the yoke 190 thereby to mount the yoke for rocking movement about the shaft as the yaw axis. Angular adjustment of the yoke and head about the shaft is effected by a pressure fluid operated piston and cylinder assembly 202 having the cylinder 204 pivotally secured onto a bracket 206 rigid with the head frame 150 while the piston 208 is pivotally secured to a portion of the yoke 190 laterally offset from the yaw axis 194.

As illustrated in FIG. 6, the entire head assembly which now includes the blasting head, the yoke 190, in which the blasting head is mounted for rocking movement about the pitch axis, and the head frame 150 on which the yoke 190 is mounted for rocking movement about the yaw axis, is supported on the rollers 140 for relative movement in the direction toward and away from the surface to be treated by the pressure fluid piston and cylinder assembly 160–162 as previously described.

Rocking movement of the head about its yaw axis and endwise positioning of the head for sealing engagement with the surface is controlled by a pair of proximity sensing members 210. The sensing members are rigidly mounted on a platform 212 rigid with the blasting head and on opposite sides of the head in substantially vertical alignment with the guide rollers 174. The sensing members are capable of a number of functions in control of the operation of the blast system.

The laterally spaced apart sensing heads are connected to valve means for operation of the piston and cylinder assembly 202 between the head frame 150 and the yoke 190 for angular adjustment of the yoke and head in response to signals transmitted by one or the other of the laterally spaced apart sensing members 210 as one or the other loses contact with the surface by reason of change in surface contour.

The laterally spaced apart sensing heads also operate switch means for actuation of the piston and cylinder assembly 160–2 between the inner frame 130 and the head frame 150 for adjustment of the head frame and blasting head in the direction toward and away from the surface in response to operative pressure between the surface and the sensing members thereby automatically to adjust the head for the desired pressure contact with the surface.

The laterally spaced apart sensing members can also operate through suitable means to close the valve 76 and shut down the flow of abrasive to the throwing wheel responsive to loss of contact between both of the sensing members and the surface thereby to indicate complete separation between the surface and head and loss of the desired sealing relationship therebetween.

It will be understood that the controls achieved by the rollers 156 can be embodied in the sensing members thereby to enable elimination of the rollers and supporting structure. Under such circumstances, sensing members could be arranged in vertically spaced relation as well as in laterally spaced apart relation to detect changes in curvature or angle of the wall while at the same time sensing sealing engagement with the wall.

The main frame also supports a horizontally disposed platform 220 on which an operator may stand for vertical movement alongside the blasting head and a control panel 222 alongside the platform with control buttons for the various operations under the control of the operator.

While the dust collector can be mounted on the main frame for vertical movement with the blasting head, it is preferred separately and stationarily to mount the dust collector as a unit separate and apart from the main frame, especially when the collector is of the dust tube type. When use is made of a separately supported stationary dust collector for use with a vertically movable dust generator, such as the described blast assembly, long expandable ductwork of the telescoping type is required in order to maintain proper communication between the dust collector and generator. Ductwork of this type is incorporated with a large number of problems as well as high cost.

A new and novel concept for communication between a vertically movable dust generator and a stationary dust collector or separator has been developed which finds use in the practice of this invention. It will be understood, however, that such means for communicating a longitudinally movable dust generator with a stationary dust collector while maintaining a substantially sealed relationship therebetween represents a novel concept which has use other than with a blasting system of the type described and thus constitutes by itself patentable invention.

As illustrated in the drawings, the means communicating the longitudinally movable dust generator or blast housing with the stationary dust collector 230 comprises an elongate, vertically disposed rigid duct 232 of rectangular, triangular, or polygonal shape, having an open outer wall 234 which is covered throughout its length by a flat, flexible or rubber-like belt 236 dimensioned to have a length slightly greater than the length of the opening and a width slightly greater than the width of the opening so that the lateral edge portions of the belt will overlap flanged edge portions extending inwardly a short distance into the opening from the side edges of the adjacent side walls of the duct. The upper and lower end portions of the belt 236 are fixed to the duct with the opening in the duct dimensioned to have a length corresponding to the vertical travel of the main frame. A box 240 having upper and lower walls 242 and 246 converging to form a V-section therebetween and enclosed by side walls 248 and 250, is mounted for vertical sliding movement with the main frame while in engagement with the open side of the duct in substantially sealing engagement therewith so that the open side of the V-shaped box faces the open side of the duct for complete communication therebetween.

The box is dimensioned to have a width corresponding to the width of the open wall of the duct with the spaced relationship between the side walls 248 and 250 corresponding to the width of the belt.

Within the box an upper and a lower roller 252 and 254 respectively are mounted for free rotational movement in the upper and lower ends of the box and a third roller 256 is mounted for free rotational movement at the apex of the V-shaped box section. Between the upper roller 254 and the roller 256 at the apex, there is provided a rigid guide plate 258, secured at its lateral edges to the side walls of the box. The guide plate extends from the upper roll 252 to the center roll 256 from a point spaced a short distance below the lower periphery of the upper roll 252 to a tangency with the upper periphery of the center roll 256. Another similar guide plate 260 extends from a tangency with the lower periphery of the center roll 256 to a point spaced upwardly a short distance from the upper periphery of the lower roll 254.

In its mounted relationship, the rubber-like belt 236 extends into the box about the lower periphery of the upper roll 252 over the upper guide plate 258 to the rear of the box over the center roller 256 and then under the lower guide plate 260 to the lower roll 254. Thus the belt is deflected from the duct throughout the length between the upper and lower rollers 252 and 254 of the box to enable communication between the box and the duct while maintaining a sealed relationship therebetween independently of the vertical position of the box relative the duct. Thus the flat rubber belt 236 covers the open side of the duct throughout the entire length of the opening except the area between the upper and lower rollers of the triangularly shaped box where the rubber-like belt is deflected about the rollers within the box. During vertical movement of the box relative the duct, the belt slides over the guide plates for guided support during travel through the box and about the rollers and to assist such guided support, it is desirable to form the ends of the supporting plates 258 and 260 with curvilinear lips 262.

An opening 264 is provided in a side wall of the box and the flexible tubing 82 connects the inlet opening 264 with the outlet openings 84 in the upper wall of the blast chamber. Another opening is provided in one of the side walls of the vertical duct and tubing or other means communicates the outlet opening of the duct with the inlet opening to the dust collector 230.

Suction from the dust collector operates to hold the flat belt 236 in substantial sealing engagement at its lateral edges with the duct 232. The box is connected to the main frame for movement vertically relative the duct with the blast assembly. Thus as the assembly moves up and down the masts, the box 240 moves with the assembly relative the duct and the belt is displaced away from the wall through the length covered by the box.

Various means may be provided for guiding the box 240 in sealing engagement between the lateral edges of the duct. One such means comprises spaced flanges of the lateral edges of the side walls of the box to define a recessed portion therebetween in which the flange portions extending inwardly from the side walls of the duct are received in sliding engagement. It will be understood that the vertical duct can be of triangular or other polygonal shapes and that other means may be provided for sliding engagement of the box relative the open side of the duct.

In operation, the main frame is raised to the desired level alongside the surface to be cleaned. The head frame is then displaced forwardly until the desired sealing engagement is established between the sealing members and the surface and thereafter the abrasive material is metered by the valve 76 for flow from the feed hopper 62 to the throwing wheel.

The wheel throws the abrasive forwardly at high velocity through the head opening onto the work surface and the spent abrasive falls gravitationally downwardly over the shed plates 40–48 to the bottom of the housing for linear displacement by the screw 54 over the screen member 56. The reusable abrasive particles which pass through the screen are returned to the hopper by the tube elevator.

The suction from the dust collector causes air to be drawn into the blast housing for flow upwardly over the ends of the shed plates to air wash the abrasive falling from the ends of the plates whereby the dusts and dirt are removed from within the housing through the outlets 84 to the dust collector.

While continuing to operate, the head can be moved up or down by the lift chain 116 to cover vertical sections of the surface and it can be moved laterally for covering an area of the surface without readjustment of the entire assembly. After blast cleaning a vertical section of the surface, the blasting operation can be stopped and the tower with the entire assembly moved to a new location for blasting another vertical section.

The guide rollers and the sensing members operate automatically to adjust the head angularly about its horizontal or vertical axis to conform the head to any change in contour of the surface. The sensing members also operate to effect stoppage of flow of particulate abrasive material to the throwing wheel in the event that the desired sealing relationship between the head and the surface becomes broken thereby to avoid loss of abrasive or the exhaust of dirt and dust into the atmosphere.

While the sealed relationship is maintained between the head and the surface, spent abrasive is recovered for use and dirt and dusts are withdrawn from within the chamber for separation without being exhausted into the atmosphere.

Thus a continuous operation is achieved which permits efficient and economical use to be made of more expensive and reusable abrasive, and without loss of abrasive or exhaust of dust and dirt into the atmosphere. A much quieter operation is provided by reason of the seal that is maintained about the area being worked.

It will be understood that changes may be made in the details of construction, arrangement and operation without departing from the spirit of the invention, especially as defined in the following claims.

I claim:

1. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material, said sealing means comprising a pair of inner and outer resilient members extending continuously about the opening in spaced apart relation and which includes an air chamber about a portion of the housing, openings between the air chamber and the space between the inner and outer resilient sealing members communicating said space with the air chamber, and means for supply of air to said air chamber for flow of air into the space between said resilient sealing members to cool the members and release particulate material entrapped by said members.

2. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material, said sealing means comprising a pair of inner and outer resilient members extending continuously about the opening in spaced apart relation and which includes passages communicating the interior of the housing with the space between the inner and outer sealing members in the lower portion of the housing and other passages at the base of the inner sealing means for communicating the interior of the housing with the space immediately about the inner sealing means for the passage of spent particulate material from the surfaces of said sealing means into the housing.

3. A machine as claimed in claim 2 which includes vertically spaced baffle plates extending angularly downwardly into the housing as a continuation of said openings for flow of particulate material through said openings and over the baffle plates to the lower portion of said housing.

4. A machine as claimed in claim 3 which includes means for the introduction of air into the housing for flow upwardly through the housing about the ends of said baffle plates to air wash the particulate material falling from the ends of said baffle plates.

5. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material, said collector comprising a trough along the bottom portion of the housing and which includes means within the trough for displacement of particulate material in one direction, screening means over which the particulate material is displaced for separation of reusable particulate material from material which is incapable of being reused, and disposal means for removal of the latter from the machine.

6. A machine as claimed in claim 5 which includes a conveyor for return of reusable particulate material to the supply.

7. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material and conveyor means for returning reusable particulate material from the collector to the supply comprising a tubular member which extends in a continuous curvilinear part from the source for collection of reusable particulate material to the supply and back, an endless member extending through said tubular member, spaced gaskets on said endless member dimensioned slidably to engage the walls of the tubular member for sweeping particulate material in the path thereof through said tubular member, means for endwise displacement of said continuous member in one direction, an opening in the tubular member communicating the interior of the tubular member with the source of reusable material at the bottom of the housing and another opening in the tubular member at the supply at the top of the housing for flow of reusable material into the tubular member at the bottom and from the tubular member at the top to the supply.

8. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material and which includes baffle plates extending angularly downwardly into the housing from a level immediately below the opening for flow of particulate material gravitationally to the lower portion of the housing and an inlet in the housing for the introduction of air below the lower end of the baffle plate to provide an air stream through which the particulate material falls from the baffle plate to air wash the particulate material.

9. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material, means mounting the blasting head for movement vertically between raised and lowered positions and in which the dust collector is a stationary collector and which includes means communicating the interior of the blasting head with the dust collector while permitting vertical movement of the blasting head relative to the dust collector comprising a vertically disposed duct having an open side dimensioned to have a length corresponding to the length of vertical travel of the blasting head, a flexible belt covering said opening without attachment to the duct throughout the length covering said open side, a head box connected for vertical movement with the blasting head and having an open side in facing relation with the open side of the duct and dimensioned to have a width between side walls of the head box corresponding to the width of the belt, deflector means within the head box over which the belt travels to deflect the belt in the direction away from the open side of the duct in the area covered by the head box for direct communication between the interior of the head box and the duct through the adjacent open sides, conduit means connecting the interior of the interior of the head box with the interior of the blasting head and other conduit means connecting the interior of the duct with the dust collector means for maintaining subatmospheric conditions within the duct constantly to urge the belt into sealing engagement with the duct to seal off the open side.

10. A machine as claimed in claim 9 in which the duct is of polygonal shape in cross-section to provide a flat open side and in which the sealing belt is a flat belt formed of rubber-like material.

11. A machine as claimed in claim 9 in which the rollers are mounted within the head box for free rotational movement about axes which define the vertices of a triangle with two of the rollers corresponding to the base of the triangle adjacent the open side of the head box with the intermediate roller at the apex spaced in the direction away from the open side and in which the belt passes about the inner peripheral portions of the rollers at the open side and about the outer periphery of the roller at the apex to guide the belt in a triangular path through the head box.

12. A machine as claimed in claim 11 which includes guide plates extending from the rollers at the base of the triangle to the rollers at the apex to support the portion of the belt between the rollers.

13. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material and which includes means mounting the blasting head for movement in a vertical direction, for movement in a lateral direction and for movement endwise towards and away from the surface comprising a stationary tower, a main frame, means mounting the main frame on the tower for movement of the main frame vertically relative to the tower and means operatively engaging the main frame for raising and lowering the main frame, an inner frame, means mounting the inner frame on the main frame for movement laterally relative the main frame, means interconnecting the main frame and the inner frame for displacement of the inner frame laterally relative the main frame, a head frame, means mounting the head frame on the inner frame for movement of the head frame forwardly and rearwardly relative the inner frame in the direction towards and away from the inner frame, power operated means interconnecting the inner frame and head frame for displacement of the head frame endwise relative the inner frame, and means mounting the blasting head on the head frame.

14. In a machine for the treatment of large surfaces with dry particulate material thrown against said surfaces at high velocity, a blasting head comprising an enclosure in the form of a housing having an opening in one wall, throwing means within the housing for projecting dry particulate material at high velocity through the opening, resilient sealing means extending continuously about the opening for engagement with the surface to be treated, means for movement of the blasting head in the direction towards and away from the surface to effect sealing engagement by the surface and the sealing means for establishing a sealing relationship between the interior of the housing and the surface, feed means communicating a supply of dry particulate material with said throwing means for feeding dry particulate material to said throwing means, a collector at the bottom of the housing for receiving spent particulate material, a dust collector and means communicating the dust collector with the interior of the housing for removal of dirt and dust generated by surface treatment with the particulate material and which includes a head frame, and means mounting the blasting head on the head frame for movement in the direction toward and away from the vertically disposed surface and for rocking movement about vertical and horizontal axes relative the head frame and in which means mounting the blasting head for rocking movement about the horizontal axis relative the head frame comprises a horizontally disposed yoke having arms which extend alongside the blasting head and means pivotally interconnecting the sides of the blasting head with the adjacent yoke arms for rocking movement of the blasting head relative the arms about a horizontal axis.

15. A machine as claimed in claim 14 in which the means interconnecting the side walls of the blasting head with the yoke arms comprises a spindle on one and a trunnion on the other for pivotally supporting the blasting head on the yoke with the spindle defining the pivotal axis.

16. A machine as claimed in claim 14 which includes power operated means interconnecting the blasting head and yoke for rocking the head relative the yoke about the horizontal axis, vertically spaced sensing means extending forwardly of the blasting head in position to engage the surface and means responsive to said sensing means for actuation of said power operated means to rock the head in one direction or the other.

17. A machine as claimed in claim 14 in which the means mounting the blasting head for rocking movement about the vertical axis relative the head frame comprises means supporting the yoke for rocking movement about a vertical axis and power operated means interconnecting the yoke with the head frame for rocking the yoke about a vertical axis relative the head frame.

18. A machine as claimed in claim 17 which includes laterally spaced apart sensing means extending forwardly of the blasting head alongside the opening and means responsive to said sensing means for actuation of the power operated means to adjust the yoke in one direction or the other about its vertical axis.

References Cited

UNITED STATES PATENTS

| | | | |
|---|---|---|---|
| 1,990,318 | 2/1935 | Dake | 51—9 |
| 3,034,262 | 5/1962 | Pawlson | 51—9 |
| 3,262,228 | 7/1966 | Schenek | 51—9 |

FOREIGN PATENTS 846,217  7/1949  Germany.

HAROLD D. WHITEHEAD, Primary Examiner